United States Patent Office 3,198,685
Patented Aug. 3, 1965

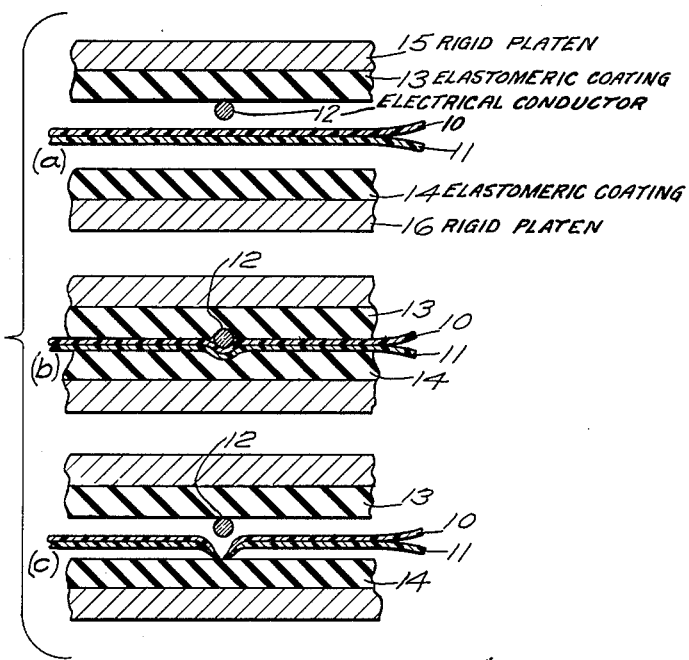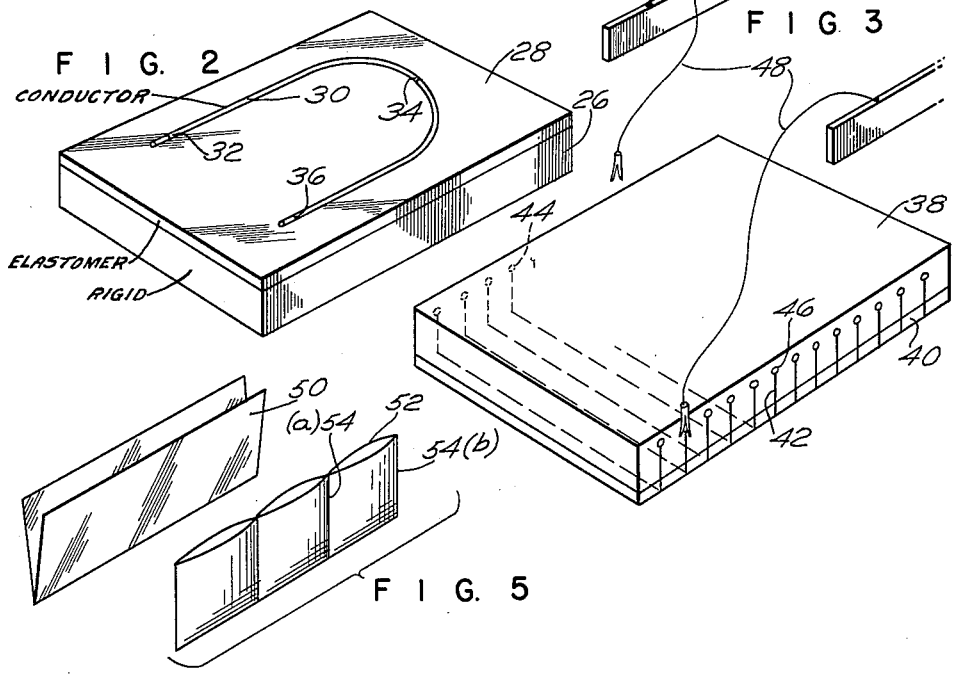

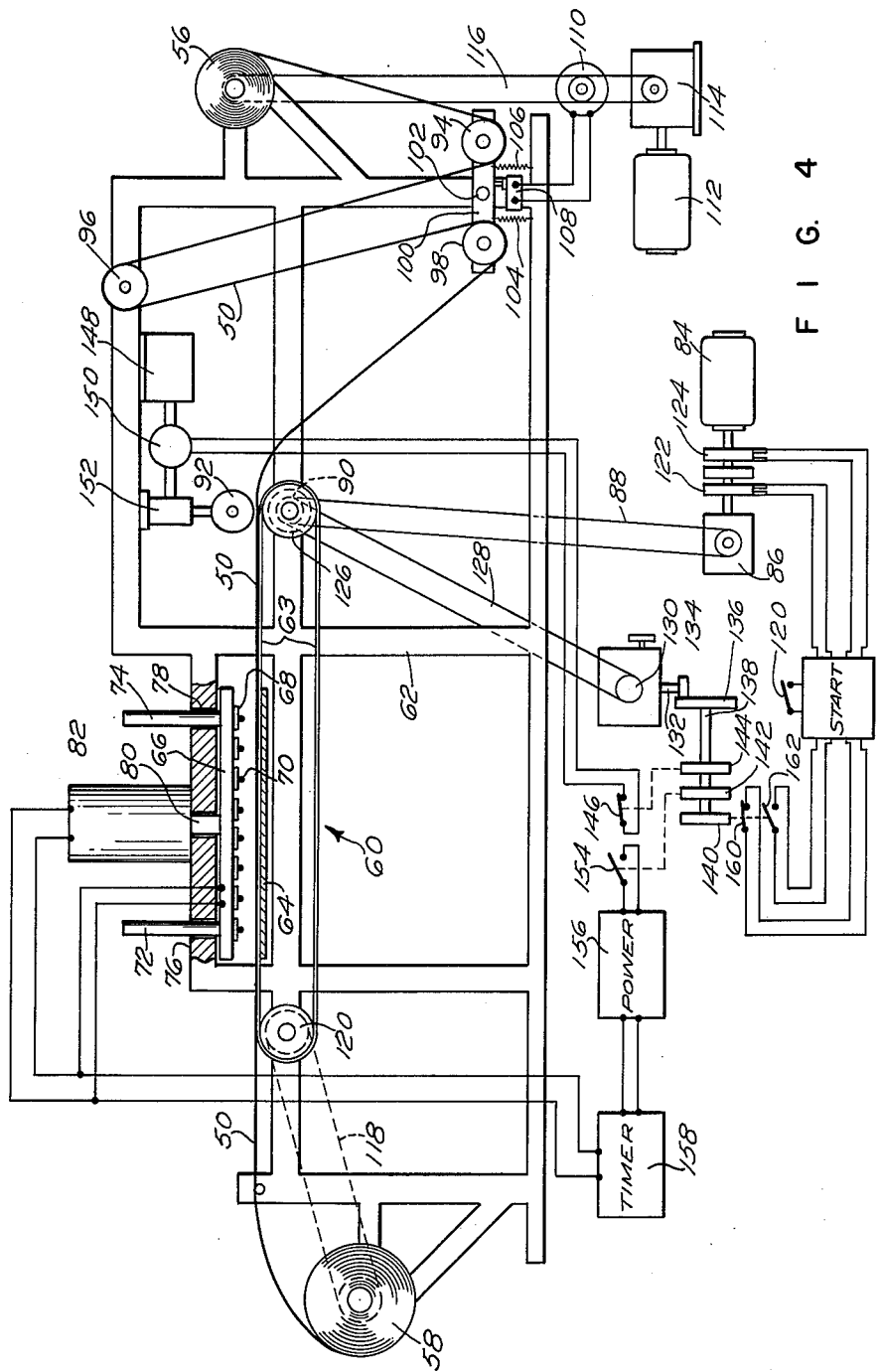

3,198,685
APPARATUS FOR HEAT SEALING
Louis Kopito and Henry D. Swartz, Brookline, and Gerald Altman, Newton Center, Mass., assignors to Thermoplastic Industries, Inc., Brockton, Mass., a corporation of Massachusetts
Filed June 16, 1961, Ser. No. 117,691
8 Claims. (Cl. 156—583)

The present invention relates to the welding of thermoplastic sheets and, more particularly, to devices for welding a pair of thermoplastic strata together along a preselected contour to provide a product composed of portions of the two thermoplastic strata within the contour. One example of such a product is a container, in the form of a bag, a glove, a rain hat, etc., the contour of which is formed in part by welding together portions of two thermoplastic strata to provide a seam, and in part from unwelded portions of the strata serving as a mouth. Difficulties have been encountered in producing seams of uniform appearance and strength. Such has been the case particularly with polyolefin sheets, e.g. polyethylene or polypropylene sheets, which in general are difficult to weld to each other because of their peculiar polymeric structure.

A primary object of the present invention is to provide novel devices, for welding thermoplastic strata to each other along a given contour, involving a momentarily heated elongated conductor disposed along the contour and a pair of resilient elastomeric surfaces, one of which is in the form of an intermittently advancing endless belt, for pressing the conductor and the thermoplastic strata together in superposition. It has been found that in consequence of the recall of the resilient surfaces, the momentarily heated wire is applied against the superposed sheets because of uniform pressure throughout and is released from the resulting weld because of the temporary character of any deformation. Preferably, one of the resilient surfaces has less resilience and greater tackiness than the other so that when the surfaces are separated from each other, the wire which is affixed to the more resilient of the surfaces, and the thermoplastic strata, which tend to adhere to the more tacky of the surfaces, become separated positively.

Other objects of the present invention are: to provide devices of the foregoing type in which automatic operation is achieved by a novel control system; and to provide devices of the foregoing type in which different contours can be selected arbitrarily in an extremely simple manner.

Further objects of the present invention will in part be obvious and will in part appear hereinafter.

For a fuller understanding of the nature and objects of the present invention, reference should be had to the following detailed disclosure taken in connection with the accompanying drawings wherein:

FIG. 1 illustrates materials undergoing a process of the present invention;

FIG. 2 illustrates a component of a device of the present invention;

FIG. 3 illustrates another component of a device of the present invention;

FIG. 4 illustrates an automatic system operative in accordance with the present invention; and FIG. 5 illustrates steps in the formation of the product of the system of FIG. 4.

Generally, the operation of the present invention, comprises the steps of: compressing the overlapping sections 10, 11 of a folded thermoplastic sheet in superposition with an elongated electrical conductor 12 at a relatively low temperature between a pair of resilient platens 13, 14 provided with rigid backings 15, 16 (FIG. 1(a)); directing a pulse of current through the conductor by which collocated increments of the thermoplastic sheets registered with the elongated conductor are welded together (FIG. 1(b)); and separating the resilient platens and, consequently, the elongated conductor and welded sheets, from each other (FIG. 1(c)). It will be observed that when the pressure is applied, the resilient platens as well as the collocated increments are deformed as in FIG. 1(b) and that when the pressure is released as in FIG. 1(c), resilient platen 13 tends to spring free of the collocated increments but resilient platen 14 tends to adhere to the collocated increments.

The elongated electrical conductor, for example, may be any high resistance metallic or metallodial material such as a nickel-chromium binary alloy composed of the following as a nickel-chromium binary alloy composed of nickel, chromium, manganese, silicon and carbon. The resilient platen against which the elongated electrical conductor abuts preferably in one case is a silicone elastomer generally consisting of alternating atoms of silicon and oxygen with substituents on the silicon atoms to impart the elastomeric character. Specifically, silicone elastomers are compositions containing high molecular weight linear silicon polymer, finely divided silicon dioxide as a filler and a peroxidic curing agent. The resilient platen, against which the collocated thermoplastic sheets abut, in one case generally is a natural rubber such as cis-1, 4-polyisoprene or a synthetic rubber such as butadiene-styrene, neoprene, butyl-rubber, nitrile rubber, polysulfide rubber, chlorosulfonated, polyethylene, polyurethane, cis-1, 4-polybutadiene and adduct rubber. Alternatively, in various applications, the foregoing resilient platens may be reversed. Generally, the elongated conductor is heated from initial room temperature to a welding temperature of between 200–1500° C. and, preferably, to approximately 1000° C. for a period ranging from .1 to 6 seconds and, preferably, approximately 1 second. The pressure between the resilient platens may be varied within wide limits, a preferred pressure ranging from 2 to 20 pounds per linear inch of seal and being preferably approximately 10 pounds per linear inch of seal. In general, the durometer of the silicone platens ranges from 15 to 100. Preferably, the durometer of the more resilient stratum, for example the silicone platen, ranges approximately from 15 to less than 70 and the durometer of the less resilient platen, for example the natural or synthetic rubber platen, ranges approximately from 70 to 100. "Durometer" herein is used in the conventional sense to indicate hardness of elastomeric materials in accordance with generally accepted and standardized engineering usage. Auxiliary resilient strata may be interposed between the resilient platens and the collocated increments for various purposes. For example, where the thermoplastic strata are printed, it is desirable to interpose between the elongated conductor and the thermoplastic strata a release stratum composed for example of parchment or waxed paper.

FIGS. 2 and 3 illustrate two devices for performing different functions in accordance with the present invention. The device of FIG. 2 is in the form of a rigid backing 26, a silicone rubber layer 28 and a curved elongated conductor 30 that is held to layer 28 by thin metallic thread at points 32, 34 and 36. Alternatively, the curved elongated conductor may be attached to layer 28 by a pressure sensitive adhesive tape, for example, a Teflon or glass cloth web backed by a heat curing partially polymerized synthetic plastic. The component of FIG. 2 is used in conjunction with a platen of the type shown in FIG. 1 at 15, 16. The component of FIG. 3 is in the form of a rigid backing 38 having at its front a silicone rubber facing 40. At spaced intervals along facing 40 are elongated wires 42 which are tensioned between connectors 44 and 46 along opposite edges of rigid backing 38. Selected ones of connectors 44 and 46 may be connected across a suitable power supply by jumpers 48 in order to enable different operative spacings between the wires.

With reference now to FIG. 4, there is shown an automatic system embodying the present invention for sealing a folded elongated sheet of the type shown in FIG. 5(a) at 50. The result is a series of containers shown in FIG. 5(b) at 52 welded at their opposite edges 54 and stripped from each other by any suitable means. The folded elongated sheet is directed from a supply roll 56 to a takeup roll 58 through a welding station 60. As shown, the apparatus includes a frame 62 on which the operating components are mounted.

Generally, folded elongated sheet 50 is fed into welding station 60 on a conveyor belt 63 composed of a relatively hard rubber of the type described above. Conveyor belt 63 moves in contiguity with rigid backing element 64. Mounted for reciprocation along a vertical axis is a pressure element including a rigid backing 66 and a resilient facing 68 in the form of transverse strips composed of relatively soft silicone rubber. Across facing 68 are a plurality of wires 70 of the type shown at 42 in FIG. 3. Backing 76 is connected to a pair of upstanding shafts 72 and 74 which reciprocate in suitable guides 76 and 78. At the center of backing 66 is a shaft 80, which is reciprocated under controlled pressure by a cylinder 82. Conveyor belt 63 is driven by a motor 84 through a suitable transmission 86, a belt 88 and a pulley 90. Positive advancement of folded sheet 50 is ensured by a pressure idler wheel 92. The operation of conveyor belt 63 and pressure wheel 92 will be described in detail below. The manner in which supply roll 56 and takeup roll 58 are driven will be described now.

It will be noted that folded sheet 50 extends from supply roll 56 into contact with a first idler roll 94, a second idler roll 96 and a third idler roll 98. Idler rolls 94 and 98 are rotatably journaled at opposite ends of a centrally pivoted cross-piece 100. Cross-piece 100 is pivoted at 102 to frame 62. Idler roller 96 is journaled on frame 62 at a position removed from the vertical axis through pivot point 102. A pair of springs 104 and 106 tend to maintain cross-piece 100 horizontal. The arrangement is such that when folded sheet 50 is advanced, the vector forces on cross-piece 100 rotate it in a clockwise direction. In consequence, a micro-switch 108 is actuated and a clutch 110 connects a motor 112 through a transmission 114 and a belt 116 to supply roll 56. Takeup roll 58 is driven by a suitable belt 118 from conveyor belt roll 120 when conveyor belt 63 is advanced by motor 84.

The control system for the foregoing components is started by a manual switch 120, which releases a clutch brake 122 and actuates a clutch plate 124 to operatively connect motor 84 to transmission 86 and thence to conveyor belt roll 126. Conveyor belt roll 126 is operatively connected through a belt 128 to a variable speed transmission which serves as an integrator to provide an infinitely variable ratio between its input 130 and its output 132. This construction for example includes a pair of disks 134 and 136 which frictionally engage at different points depending upon their adjustable relative locations. Output 132 controls the rotation of a shaft 138 which provides three cam profiles 140, 142 and 144. Cam profile 144 operates initially to open a normally closed switch 146 whereby fluid is directed from pressure chamber 158 through valve 150 into cylinder 152 in order to direct roll 92 against roll 126 for the purpose of positively engaging elongated sheet 50. Cam 142 actuates normally open switch 154 in order to apply power from a supply 156 to a timer 158 and thence to cylinder 82 and wires 70. Cam 140 opens normally closed switch 160 and closes normally open switch 162 in order to release pressure plate 124 and to actuate bridge plate 122. At this point, cam 144 again closes switch 146 in order to release pressure roll 92 and to permit, for example, the positions of portions of sheet 50 to be adjusted manually.

In operation, after elongated sheet 50 has been threaded through the machine from supply roll 56 to idler roller 94, idler roller 96 and idler roller 98, between rolls 92 and 126, in contact with conveyor belt 63 and to take-up roller 58, the operation is entirely automatic. Actuation of switch 120 causes the cycle to start in such a way that conveyor belt 63 and pressure roll 92 advance a predetermined length of sheet 50 into welding station 60. The quantity of material advanced into welding station 60 is determined by the relative positions of disks 134 and 136 of the variable speed transmission. Thereafter platen 66 and platen 64 are pressed against each other by cylinder 82 and a pulse of electrical current is applied through wires 70 by power supply 156, the configuration of the pulse being determined by timer 158. Following the operation of timer 158, cam 140 operates brake 122 and causes roller 126 to be driven by motor 84 through transmission 86.

The following examples will further illustrate the operation of the present invention.

*Example I*

A pair of polyethylene sheets, each .001 inch thick, were welded together along a partially straight and partially curved line in accordance with the process of FIG. 1 in the device of FIG. 4. Conductor 12 was composed of a nickel-chromium binary alloy of the composition described above, had a thickness of .030 inch and a resistance of 1.3 ohms per foot. Resilient platen 13 was composed of silicone rubber having a durometer of 30 and resilient platen 14 was composed of neoprene having a durometer of 70. The pressure applied to platens 13 and 14 was 10 pounds per linear inch. After this pressure was applied initially, conductor 12 was heated to 1000° F. for a period of ½ second and was permitted to cool for a period of 3 seconds. A partially straight and partially curved sharply cleaved seam of excellent uniformity and strength resulted.

*Example II*

Example I was repeated except that: platen 13 was composed of polyurethane having a durometer of 70; conductor 12 was .040 inch in diameter; a flexible heat resistant polytetrafluoroethylene stratum .0035 inch thick was interposed between conductor 12 and superposed strata 10, 11; platen 14 was composed of polyurethane having a durometer of 20; and a flexible heat resistant stratum of fibreglass impregnated with polytetrafluoroethylene was interposed between superposed strata 10, 11 and stratum 14. A flat fairly wide seal resulted.

*Example III*

Example I was repeated except that a wax paper (felted cellulose fibres impregnated with paraffin) was interposed as a release stratum between strata 10, 11 and conductor 12 together with platen 13.

*Example IV*

Example I was repeated except that a wax paper was interposed as a release stratum between strata 10, 11 and platen 14.

It thus has been found that the above described device enable the formation of plastic welds of excellent appearance and strength. Since certain changes may be made in the above described device and process without departing from the scope of the invention herein involved, it is intended that all matter contained in the above description or shown in the accompanying drawings shall be interpreted in an illustrative and not in a limiting sense.

What is claimed is:

1. A device for welding together registered portions of thermoplastic sheets, said device comprising a pair of elastomeric pressure faces directed toward each other, a pair of rigid backing platens on opposite sides of said pressure faces, one of said backing platens being constrained for movement with respect to the other of said backing platens for compressing said pressure faces toward and releasing said pressure faces from each other, an endless belt including the other of said faces as one of a succession of increments, said endless belt being constrained for cyclic movement, and a heat sealing element movable with said one of said backing platens positioned between said faces in order to heat to welding temperature registered portions of said thermoplastic sheets compressed between said faces in contact with said heat sealing element.

2. The device of claim 1 wherein one of said elastomeric pressure faces, in contact with said heat sealing element, is composed of silicone elastomer.

3. The device of claim 2 wherein the other of said elastomeric pressure faces is composed of a member of the class consisting of natural and synthetic rubbers.

4. The device of claim 1 wherein one of said elastomeric pressure faces is composed of a member of the class consisting of relatively low softening point natural and synthetic rubbers, the other of said elastomeric pressure faces is composed of a relatively high softening point silicone elastomer, and said heat sealing element is an electrical wire composed of a nickel-chromium binary alloy, the thickness of said conductor being approximately 0.030 inch and the resistance of said conductor being approximately 1.3 ohms per foot.

5. A device for welding together thermoplastic sheets, said device comprising a frame, a fixed platen and a reciprocable platen disposed in substantially parallel planes, said fixed platen being supported on said frame, pressure applying means on said frame for directing said reciprocable platen between an inoperative position remote from said fixed platen and an operative position contiguous with said fixed platen, an elastomeric facing affixed to said reciprocable platen, an elongated sealing wire affixed to said elastomeric facing, an endless elastomeric belt constrained and positioned on said frame for advancing successive portions thereof into operative position in contiguity with said fixed platen and into inoperative position away from said fixed platen, said elastomeric facing and said successive portions of said elastomeric belt being disposed between said reciprocable platen and said fixed platen and said sealing wire being disposed between said elastomeric facing and said successive portions of said elastomeric belt, and control means for intermittently advancing said successive portions of said endless elastomeric belt into operative position at said fixed platen, for directing said reciprocable platen into operative position and for directing an electrical pulse through said sealing wire in order to heat said sealing wire to a predetermined temperature, whereby said registered portions of said thermoplastic sheets carried on said endless belt are compressed between said elastomeric facing and said elastomeric belt and sealed at said predetermined temperature by heat generated in said sealing wire by said electrical pulse.

6. The device of claim 5 wherein the softening point of said elastomeric face is above said predetermined temperature and the softeneing point of said elastomeric belt is below said predetermined temperature so that said registered portions of said thermoplastic sheets adhere to said elastomeric belt in preference to said elastomeric face after being sealed.

7. The device of claim 5 wherein said elastomeric facing is composed of a silicone elastomer and said elastomeric belt is composed of a material selected from the class consisting of natural and synthetic rubbers.

8. The device of claim 5 wherein said elastomeric facing is composed of a silicone elastomer and said elastomeric belt is composed of a material selected from the class consisting of natural and synthetic rubbers, the softening point of said elastomeric face being above said predetermined temperature and the softening point of said elastomeric belt being below said predetermined temperature so that said registered portions of said thermoplastic sheets adhere to said elastomeric belt in preference to said elastomeric face after being sealed, said predetermined temperature ranging between 200 and 1500° C., said reciprocable platen when in operative position applying a pressure on said fixed platen ranging from 2 to 20 pounds per linear inch of seal, said electrical pulse ranging in duration from 0.1 to 6.0 seconds, said sealing wire being composed of a nickel-chromium alloy.

References Cited by the Examiner

UNITED STATES PATENTS

| 2,621,704 | 12/52 | Langer | 156—498 |
| 2,961,031 | 11/60 | Fener | 156—380 |
| 3,015,601 | 1/62 | Fener | 156—515 |
| 3,028,294 | 4/62 | Histed | 156—515 |
| 3,035,381 | 5/62 | Hosso | 53—182 |

EARL M. BERGERT, *Primary Examiner.*

ALEXANDER WYMAN, *Examiner.*